United States Patent [19]

Dworski

[11] Patent Number: 4,831,770
[45] Date of Patent: May 23, 1989

[54] FISHING LURE

[76] Inventor: Michael Dworski, 1919 19th Way, West Palm Beach, Fla. 33407

[21] Appl. No.: 195,829

[22] Filed: May 19, 1988

[51] Int. Cl.⁴ .............................................. A01K 85/00
[52] U.S. Cl. .................................. 43/42.24; 43/42.28
[58] Field of Search ................. 43/42.24, 42.28, 42.36, 43/42.09, 42.1

[56] References Cited

U.S. PATENT DOCUMENTS

| | | | |
|---|---|---|---|
| 1,754,567 | 4/1930 | Newell | 43/42.28 |
| 3,899,847 | 8/1975 | Dworski | 43/42.09 |
| 3,914,895 | 10/1975 | Mize | 43/42.28 |
| 3,983,656 | 10/1976 | Bain | 43/42.24 |
| 4,709,501 | 12/1987 | Garst | 43/42.24 |

Primary Examiner—M. Jordan
Attorney, Agent, or Firm—Charles S. McGuire

[57] ABSTRACT

A fishing lure in the form of an artificial minnow having a body portion with a plurality of radially extending, spaced ribs and an internal cavity, through which the line or leader extends, for containing a desired amount of sinker weight. A trailing skirt is preferably detachably secured to the body. Assembly of the skirt with the body portion is simplified by attaching the strings or streamers which form the skirt to an open, cylindrical support having internal threads for engagement with external threads on a cylindrical tail portion of the artificial minnow. As an alternative to the threaded connection, the skirt support and minnow tail portion may have cooperative, one-way, snap action assembly means such as opposing saw-tooth configurations.

14 Claims, 1 Drawing Sheet

U.S. Patent | May 23, 1989 | 4,831,770
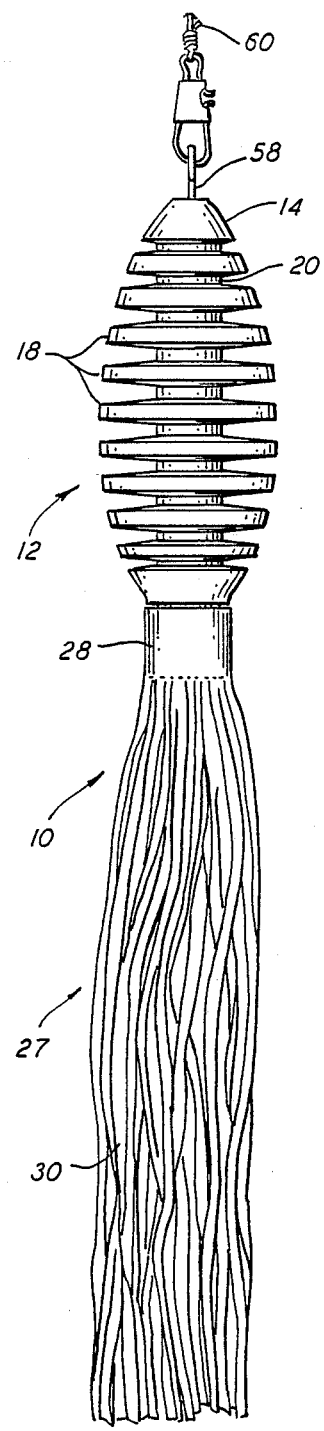
FIG. 1
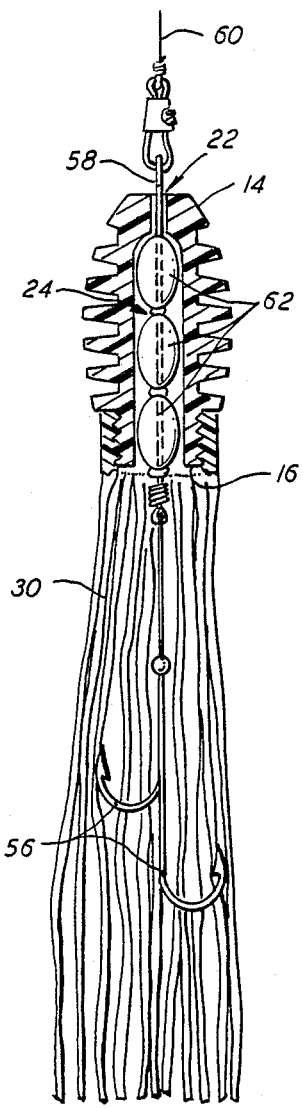
FIG. 2
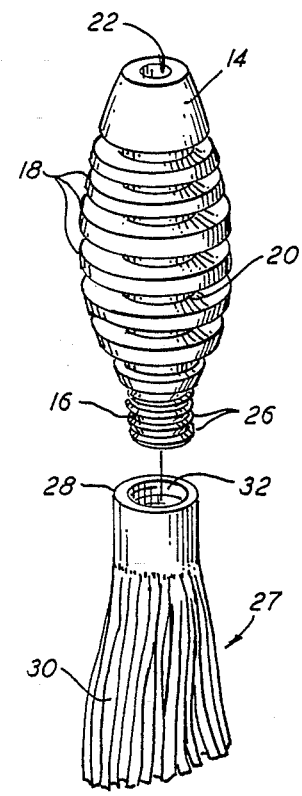
FIG. 3
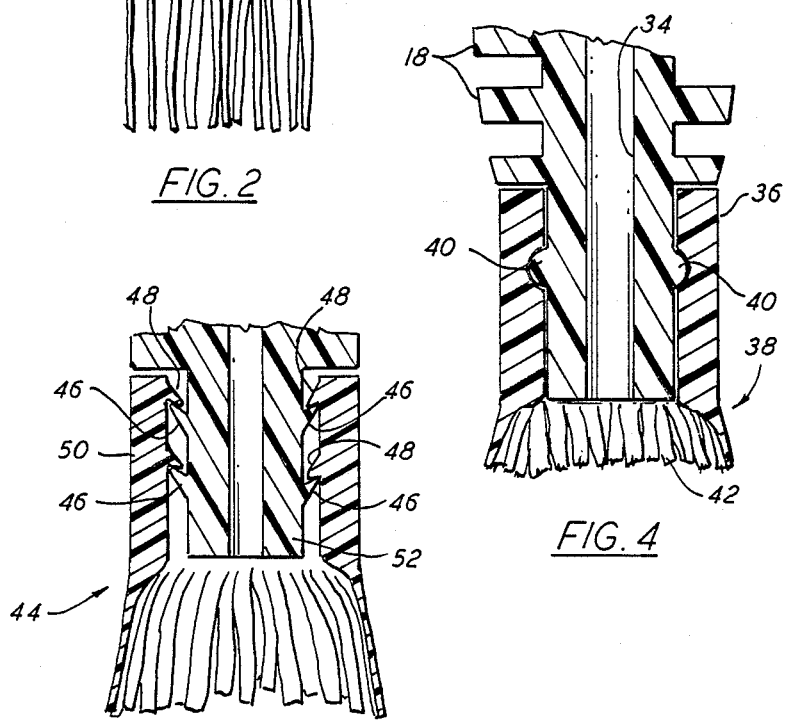
FIG. 4
FIG. 5

FISHING LURE

BACKGROUND OF THE INVENTION

The present invention relates to fishing lures, and more specifically to a lure in the form of an artificial minnow having a trailing skirt with means for simplified assembly of the minnow and skirt.

U.S. Pat. No. 3,899,847 of the present invention discloses a fishing lure in the form of a plastic minnow having head and tail portions and a central portion comprising a plurality of longitudinally spaced, fins or ribs extending radially from a central body portion. This artificial lure was a variant of that disclosed in U.S. Pat. No. 3,621,600, also of the present inventor, which included a body portion having a plurality of releasably connected, externally grooved ribs. Although the artificial minnows of these patents have proven effective in many applications, it is sometimes desirable to include a trailing skirt of individual threads, strings or streamers with an artificial minnow.

In the past, such skirts have been fabricated as integral parts of artificial minnows, or as separate elements to be attached with a hook to a line or leader. It has not been the usual practise, however, to provide an artificial minnow in a form which permits selective attachment of a skirt-type lure at the point of use. Also, the only practical means to adjust the weight of such lures has been with the addition of externally connected weights which detract from the appearance thereof.

Accordingly, it is a principal object of the present invention to provide an artificial fish bait including a plastic minnow and a trailing skirt with cooperable assembly means permitting easy and rapid connection and disconnection of the body and skirt portions.

A further object is to provide a fishing lure comprising a plastic body portion with spaced, radially extending ribs, and a trailing skirt with means for quickly and easily assembling the body and skirt portions and for selectively changing the weight of the lure.

A further object is to provide an artificial fishing lure including a plastic body portion and detachable, trailing skirt portion with means for selectively controlling the weight of the lure.

Still another object is to provide an artificial lure with internally concealed, selectively variable weight means with novel means for attaching a line or leader directly to the hook.

Other objects will in part be obvious and will in part appear hereinafter.

SUMMARY OF THE INVENTION

In accordance with the foregoing objects, the present invention contemplates a fishing lure in the manner of an artificial minnow of molded plastic having head and tail ends with spaced, radially extending ribs throughout the intervening body portion. The radially extending, spaced ribs create audible, fish-attracting sounds and/or vibrations as the lure is drawn through the water adding to the effectiveness of the lure. The body portion includes a through, longitudinal opening for passage of a line or leader, and an enlarged cavity wherein lead or other sinker weights may be placed to control the buoyancy of the lure as desired. Also, the tail portion of the lure is cylindrical and formed with external threads or ribs for selective assembly therewith of a trailing skirt having an internally threaded, cylindrical support.

BRIEF DESCRIPTION OF THE DRAWING

FIG. 1 is a plan view of the preferred embodiment of the fishing lure of the invention with the artificial minnow and skirt portions fully assembled;

FIG. 2 is a side elevational view of the lure of FIG. 1 in section on the line 2—2 thereof;

FIG. 3 is an exploded, perspective view of the lure of FIGS. 1 and 2; and

FIGS. 4 and 5 are enlarged, fragmentary, elevational views, partly in vertical section, of alternate constructions of certain parts of the lure.

DETAILED DESCRIPTION

Referring now to the drawing, the artificial lure of the invention, denoted generally by reference numeral 10, includes unitary body portion 12 of molded plastic, having head and tail portions 14 and 16, respectively, with spaced ribs 18 extending radially from central portion 20. Opening 22 extends through head portion 14 and enlarged, central cavity 24 adjoins opening 22 and extends through the remainder of body portion 12, including tail portion 16.

Tail portion 16 is cylindrical in configuration and includes external threads 26 which may be conveniently molded into the structure. Lure 10 further includes skirt portion 27, comprising open cylindrical member 28 and strings or streamers 30 affixed thereto. Cylindrical member 28 includes internal threads 32 for mating with threads 26 on tail portion 16, thus permitting selective removal of skirt portion 27 from lure 10 and replacement in like manner with other skirt portions of different colors and/or streamer length or configuration. This provides a high degree of versatility, permitting the optional use of a wide variety of trailing skirts with the basic artificial minnow forming the body portion. Of course, the skirt portion may be formed integrally with the body portion, if desired, in conventional manner.

An alternate embodiment is provided in constructions shown in the fragmentary, sectional views of FIGS. 4 and 5. In this construction, hollow tail portion 34 and support member 36 are similarly configured for telescoping engagement, but need not be cylindrical in shape. For example, they may be square or triangular in transverse cross section. In any event, the two portions, i.e., tail portion 34 and member 36, are formed with cooperative detent means for retaining skirt portion 38 in assembled relation with tail portion 34. In the construction of FIG. 4, tail portion 34 is formed with a protruding, curved boss 40 on one or more external surfaces for engagement with a snap fit in complementary recesses in the internal surfaces of support member 36 to which streamers 42 are affixed.

The plastic material from which member 36 is formed is sufficiently resilient to permit sliding movement of member 36 over tail portion 34 with the boss(es) on the latter passing through member 36 to the extent necessary before engaging in the recess(es) provided therefor. Alternatively, a longitudinal slot (not shown) may be provided in member 36 to permit expansion thereof during assembly with tail portion 34. The detent retaining means of FIG. 4 are intended to permit easy and rapid assembly of skirt portion 38 with the body portion of the lure, as well as disassembly to permit removal and replacement of the skirt portion.

In the FIG. 5 construction, skirt portion 44 is formed separately from the body portion of the lure but is permanently affixed thereto upon assembly by means of oppositely directed ridges 46 and 48 on streamer support member 50 and tail portion 52, respectively. Ridges 46 and 48 are so positioned and configured, and the plastic material of member 50 and portion 52 is of such resiliency, that member 50 may be slidingly inserted over portion 52 with ridges 46 and 48 engaging one another in the fully inserted position to prevent movement in the opposite direction. This provides a permanently assembled lure having both an artificial minnow body and a trailing skirt, although the body and skirt portions are separately fabricated and quickly assembled with a one-way, snap fit assembly, thus simplifying and economizing fabrication and assembly of such a lure.

Referring again to FIGS. 1–3, lure 10 includes one or more associated hooks 56 connected to one end of leader 58, the opposite end of which is passed through cavity 24 and opening 22 in lure head portion 14 for attachment to line 60. One or more lead sinkers, split shot, or the like, denoted by reference numeral 62, may be attached to leader 58 and accommodated within cavity 24 having a diameter, for example, of about $\frac{5}{8}''$. Hooks 56 are contained within and concealed by streamers 30 in the fully assembled condition of lure 10. Since leader 58 is not directly attached to body portion 12 or skirt portion 26, the pull of a fish engaged on one of hooks 56 is transmitted through leader 58 directly to line 60, thereby reducing the chances of damaging or losing the lure.

From the foregoing, it may be seen that the lure of the present invention is both versatile and effective, as well as economical in manufacture and assembly. The lure body includes radial, spaced ribs which create sound and/or vibrations which are known to attract fish as the lure is drawn through the water at the end of a fishing line. The lure body includes a central cavity through which the line or leader extends and wherein a selective amount of sinker weights may be placed to control the depth at which the lure will be positioned. A trailing skirt may also be provided on the lure body, either formed integrally therewith or fixedly or detachably secured thereto. Detachable coupling permits selective use or non-use of the skirt with fast and easy assembly, as well as the option of changing to skirts of different colors, lengths, materials, etc.

What is claimed is:

1. A molded plastic fishing lure in the form of an artificial minnow having a central, longitudinal axis comprising:
   (a) a head portion having a bore extending therethrough along said longitudinal axis;
   (b) a central body portion symmetrically arranged about said longitudinal axis and integrally joined to said head portion;
   (c) a tail portion of predetermined external configuration symmetrically arranged about said longitudinal axis and integrally joined to said central body portion;
   (d) a plurality of longitudinally spaced rib elements extending radially about said central body portion; and
   (e) a central cavity symmetrically arranged about said longitudinal axis extending through both said central body and tail portions and communicating at its forward end with said bore for passage of a line or leader loosely through said bore and said cavity.

2. The fishing lure of claim 1 and further including at least one sinker weight positioned within said cavity.

3. The fishing lure of claim 2 and further including a line or leader extending through said bore and said cavity to a terminal end rearwardly of said tail portion, and hook means secured to said terminal end of said line or leader.

4. The fishing lure of claim 3 wherein said sinker weight is attached to the portion of said line or leader within said cavity.

5. The fishing lure of claim 2 and further including a trailing skirt portion affixed to said tail portion.

6. The fishing lure of claim 5 wherein said skirt portion surrounds said hook means.

7. The fishing lure of claim 6 wherein said skirt portion is detachably secured to said tail portion.

8. The fishing lure of claim 7 and further including cooperable thread means on said skirt and tail portions for selective, detachable engagement thereof.

9. A fishing lure comprising:
   (a) a molded plastic body in the form of an artificial minnow having a central, longitudinal axis and including:
      (i) a head portion having a bore extending therethrough along said longitudinal axis;
      (ii) a central body portion symmetrically arranged about said longitudinal axis and integrally joined to said head portion;
      (iii) a tail portion of predetermined external configuration symmetrically arranged about said longitudinal axis and integrally joined to said central body portion;
      (iv) a plurality of longitudinally spaced rib elements extending radially about said central body portion; and
      (v) a central cavity symmetrically arranged about said longitudinal axis extending through both said central body and tail portions and communicating at its forward end with said bore for passage of a line or leader loosely through said bore and said cavity;
   (b) a skirt portion including
      (i) a hollow support member having an internal configuration complementary to said predetermined configuration of said tail portion, whereby said support member may be placed in surrounding relation to said tail portion; and
      (ii) a plurality of streamers affixed to said support member to extend rearwardly therefrom when said support member is in said surrounding relation to said tail portion; and
   (c) cooperative engagement means on the exterior of said tail portion and the interior of said support member for maintaining said skirt portion in assembled relation with said body.

10. The fishing lure of claim 9 wherein said predetermined external configuration of said tail portion and said internal configuration of said support member are cylindrical.

11. The fishing lure of claim 10 wherein said cooperative engagement means comprises mating threads on the exterior of said tail portion and the interior of said support member.

12. The fishing lure of claim 1 wherein said cooperative engagement means comprises snap fit detent means.

13. The fishing lure of claim 12 wherein said detent means is releasable in nature, permitting selective removal of said skirt portion after assembly thereof with said tail portion.

14. The fishing lure of claim 12 wherein said detent means comprises complementary portions on the exterior of said tail portion and the interior of said support member permitting assembly thereof by sliding movement in one direction of said support member over said tail portion, and preventing disassembly by said complementary portions blocking relative movement of said support member and said tail portion in the opposite direction.

* * * * *